United States Patent [19]

Bazuin

[11] Patent Number: 4,517,866
[45] Date of Patent: May 21, 1985

[54] STEADYREST FOR SLANT BED LATHE

[75] Inventor: Johannes Bazuin, Cincinnati, Ohio

[73] Assignee: LeBlond Makino Machine Tool Co., Cincinnati, Ohio

[21] Appl. No.: 414,963

[22] Filed: Sep. 7, 1982

[51] Int. Cl.³ .......................... B23B 25/00; B24B 41/06
[52] U.S. Cl. ........................................ 82/39; 82/38 R; 51/238 S
[58] Field of Search ................ 82/39, 38 R; 74/89.15; 51/238 S, 238, 66

[56] References Cited

U.S. PATENT DOCUMENTS

| 689,951 | 12/1901 | Clare . | |
|---|---|---|---|
| 886,293 | 4/1908 | Hanson | 82/38 |
| 944,630 | 12/1909 | McCullough . | |
| 1,370,705 | 3/1921 | Norton . | |
| 1,655,027 | 1/1928 | Sokol et al. | 82/38 |
| 2,114,978 | 4/1938 | Horger et al. . | |
| 2,459,068 | 1/1949 | Eastwood | 82/39 |
| 2,577,277 | 12/1951 | Schulz et al. . | |
| 2,718,168 | 9/1955 | Kendall et al. . | |
| 2,728,254 | 12/1955 | Siekmann et al. . | |
| 3,225,631 | 12/1965 | Hermann . | |
| 3,535,963 | 10/1970 | Dietl . | |
| 4,018,115 | 4/1977 | Logan . | |
| 4,138,911 | 2/1979 | Namiguchi . | |
| 4,239,178 | 12/1980 | Engel et al. | 251/14 |

Primary Examiner—Francis S. Husar
Assistant Examiner—William E. Terrell
Attorney, Agent, or Firm—Wood, Herron & Evans

[57] ABSTRACT

An improved steadyrest includes a workpiece support quickly releasable from a workpiece upon only several adjustment screw revolutions. The support is freely movable away from a workpiece, after release, without further screw revolution. This permits full release and opening of the steadyrest without full backing off of the positioning adjustment, facilitating workpiece access and providing time savings.

6 Claims, 3 Drawing Figures

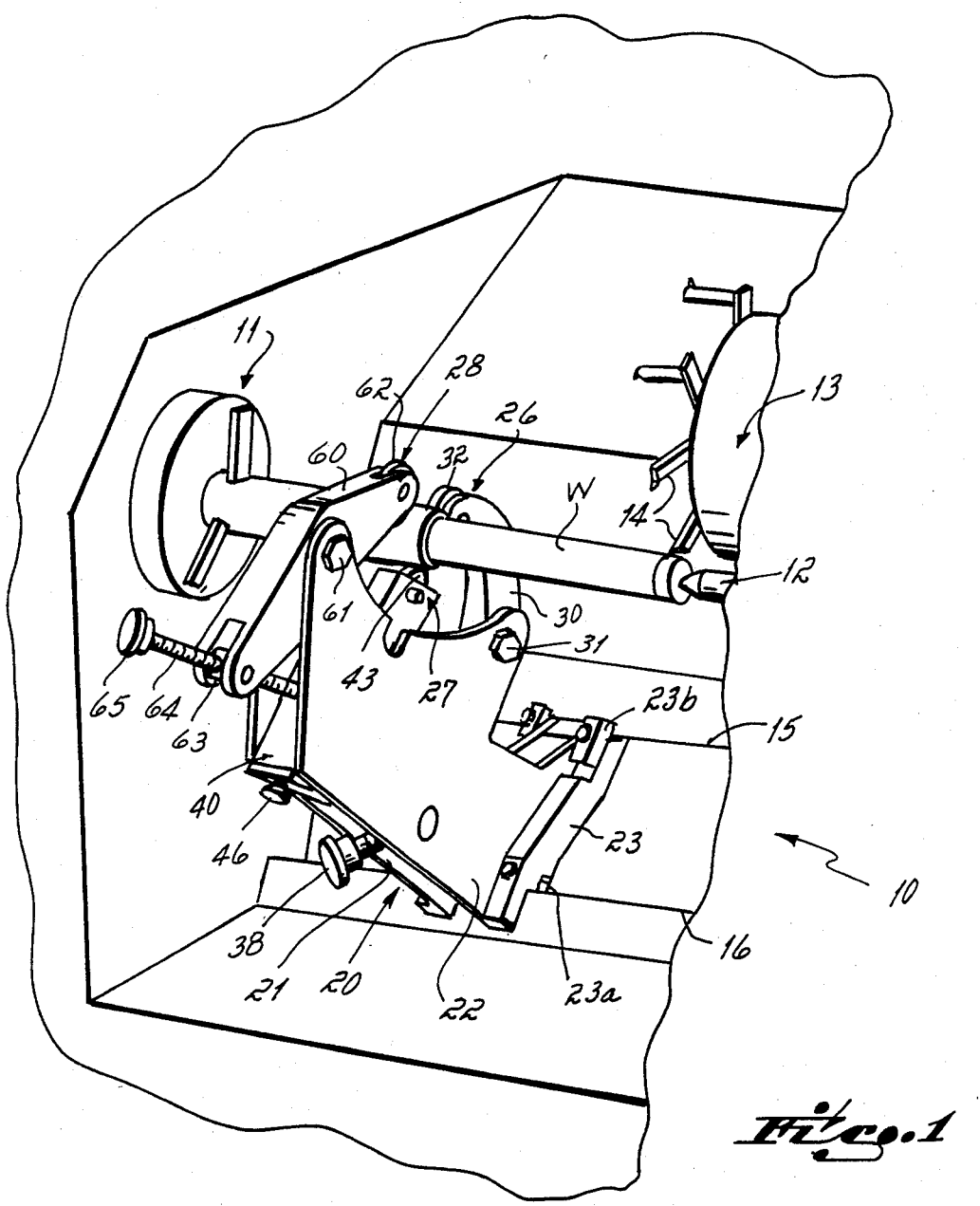

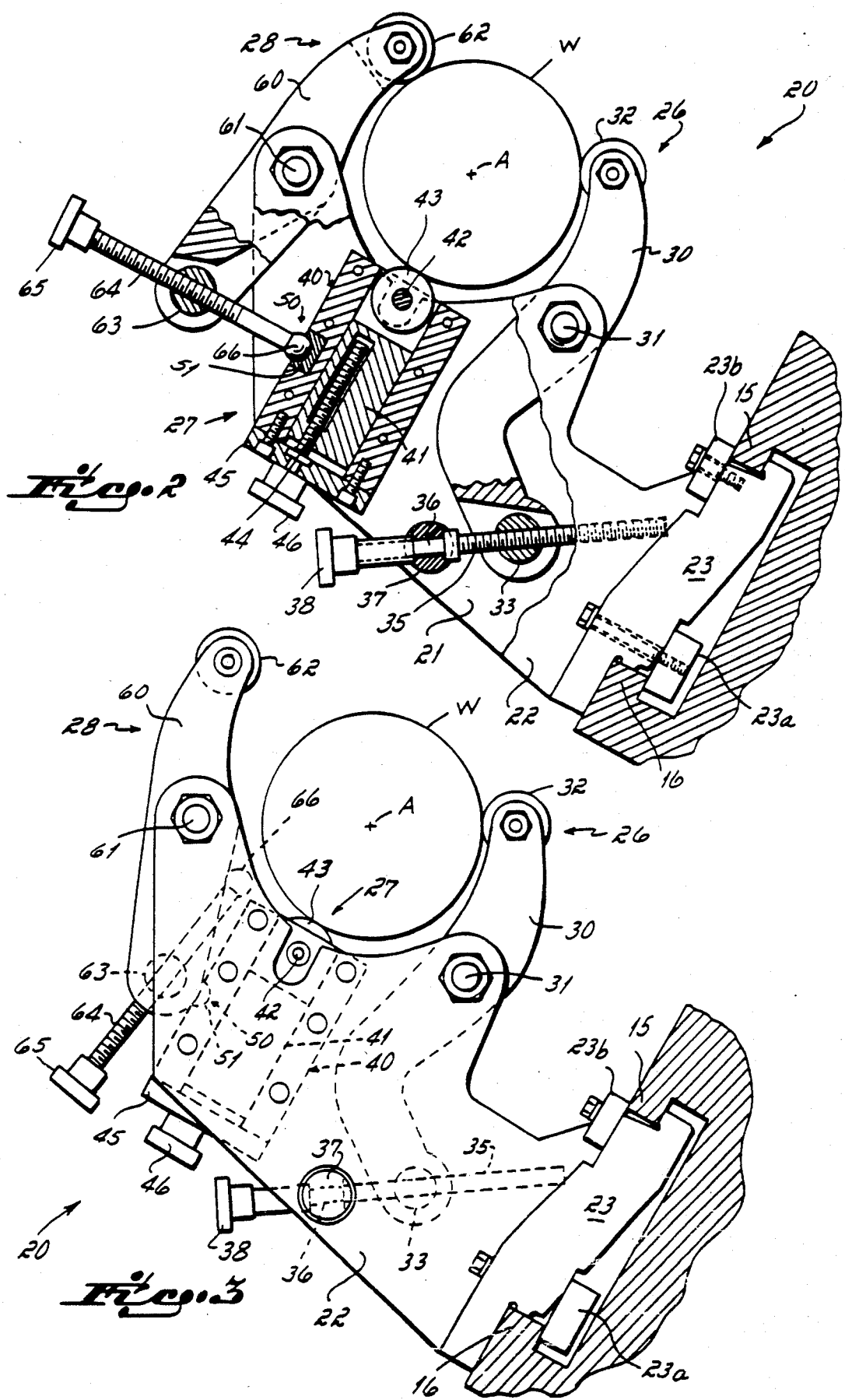

STEADYREST FOR SLANT BED LATHE

BACKGROUND OF THE INVENTION

This invention relates to steadyrests for turning apparatus and more particularly to steadyrests for slant bed lathes.

Metal cutting lathes generally include a bed, a head stock or chuck, a tail stock, and a tool holder or toll holding turret. A workpiece is typically mounted between the chuck and tail stock and tools engage the turning workpiece to produce desired cuts.

Where a turning operation calls for holding small tolerances, it is desirable to support the workpiece between the chuck and tail stock to reduce workpiece movement perpendicular to the axis of rotation. A steadyrest is normally used to provide this support. Such a steadyrest is illustrated, for example, in U.S. Pat. No. 3,225,631.

In heavy duty turning equipment adapted for handling large workpieces, or heavy cuts, it is desirable to provide a turning apparatus which permits easy access to the workpiece for handling it, and to the cutting area, for manipulating the tools. In order to provide such access, slant bed lathes are used. Such lathes have beds inclined from one side to the other about 60° from horizontal. This effectively moves the bed behind or to the far side of the workpiece, with respect to an operator, and the operator can step up to the apparatus in very close proximity to the workpiece and the tool holder.

Nevertheless, while slant bed lathes produce good access to the workpiece, the use of current steadyrests operates in a counter-productive way, obstructing the workpiece and preventing clear access to it. This difficulty is inherent in current known steadyrests, which surround the workpiece to provide support at three points, for example. While such current steadyrests may eventually be removed from the workpiece, such removal can be a tedious, time consuming process. The support rollers of the steadyrest must be withdrawn from the workpiece and all adjustment mechanisms backed off to permit the steadyrest components to clear the workpiece. Finely adjustable mechanisms require a substantial amount of time for backing off.

The difficulties of removing the steadyrest from the workpiece thus reduce the benefits of easy workpiece access provided by the slant bed lathe.

Accordingly, it has been one objective of this invention to provide an improved steadyrest for a turning apparatus.

A further objective of this invention has been to provide an adjustable steadyrest which can be quickly released from a workpiece.

A further objective of the invention has been to provide a finely adjustable, self-opening steadyrest which can be quickly released from a workpiece without backing off the entire fine adjustment, and within any portion of the range of the fine adjustment.

A further objective has been to provide an improved steadyrest for a slant bed lathe.

To these ends, a preferred embodiment of the invention includes a steadyrest having a frame, and workpiece support rollers mounted on the frame by means of swing arms pivoted to the frame. The rollers are mounted at one end of their respective swing arms, and adjustment screws are operatively connected to the other ends. At least the near side roller/swing arm has an adjustment screw with an abutment end removably disposed in a stop means or socket on the frame. It is only necessary to rotate the screw several times to release pressure on the socket, whereupon the screw end can be lifted from the socket, and the screw pivoted out of the way. This frees the entire swing arm to be pivoted away from the workpiece without further rotation of the screw.

Clear access to the workpiece is thus easily gained by only a few revolutions of the adjustment screw, and it does not have to be fully backed off in order to release the steadyrest from the workpiece.

Also, the near side support is constructed so that it is self-opening after the screw is released, the weight of the free screw tending to open the swing arm away from the workpiece.

In the preferred embodiment, a far side support roller, is swing arm mounted, but this support apparatus is not required to be releasable in the same manner as the near side support. A lower support roller also need not be releasably mounted, but is preferably mounted for reciprocal movement toward and away from the workpiece for adjustment to various workpiece sizes. The lower support apparatus includes a bracket attached to the steadyrest frame and on which is located the stop means or socket for the near side support.

Accordingly, the preferred embodiment of the invention provides an improved steadyrest, usable with a slant bed lathe, and facilitating clear and quick access to workpiece without tedious backing off of adjustments and the like. The steadyrest is self-opening and enhances operator access to the workpiece in a slant bed lathe.

These and other objectives and advantages will become readily apparent from the following detailed description of a preferred embodiment of the invention, and from the drawings in which:

BRIEF DESCRIPTION OF THE DRAWINGS.

FIG. 1 is a perspective view of a steadyrest according to the invention as used in a slant bed lathe;

FIG. 2 is a cross-sectional view of the steadyrest of FIG. 1 in closed condition; and FIG. 3 is a cross-sectional view of the steadyrest of FIG. 2, but in an open condition.

DESCRIPTION OF THE PREFERRED EMBODIMENT

Turning now to the drawings, there is shown in FIG. 1 a slant bed lathe 10 of the type with which the steadyrest of the invention is preferably utilized. Of course, it will be appreciated that the steadyrest of the invention can be utilized with various types of turning apparatus in addition to slant bed lathes.

The slant bed lathe 10 typically includes a head stock or chuck 11 and a tail stock 12. A typical workpiece W is shown mounted between the chuck 11 and the tail stock 12. The slant bed lathe further includes a tool-holding turret 13 mounting a plurality of tools 14 for engagement and cutting of the workpiece. The turret can be moved in an axial direction for cutting the workpiece along its length.

The slant bed lathe further includes elongated ways 15 and 16, the top surfaces of which are slanted side-to-side at approximately 60° with respect to the horizontal. The chuck 11 and the tail stock 12 are mounted to the slant bed lathe, the tail stock 12 being movable along the ways 15, 16 toward and away from the chuck 11.

A steadyrest 20 according to the invention is also mounted on the ways for reciprocal movement therealong. As shown in FIG. 1, the steadyrest 20 includes a frame comprising sides 21 and 22. The frame 20 is mounted on a clamping bar 23 which is adapted to be clamped to the ways 15 and 16 as shown in FIGS. 2 and 3 by means of clamping elements 23a and 23b. The steadyrest can be secured at any position as required along the ways.

The steadyrest further includes a far side workpiece support means 26, a lower support means 27 and a near side support means 28. Each support a workpiece W at a position removed from the other support positions of the steadyrest on the workpiece. Also each support the workpiece as it rotates about a turning axis A, defined by the chuck 11 and tail stock 12.

The terms, "near side" and "far side" as used herein, refer to the preferred position of an operator which is opposite the workpiece from the slant bed of lathe 10. The operator's position is thus in the foreground of the lathe as shown in FIG. 1, for example, and on the left-hand side of FIGS. 2 and 3.

The far side support means 26 includes a swing arm 30 pivoted at 31 to the frame members 21 and 22. A roller 32 is mounted at one end of the swing arm 30 such that when the swing arm is pivoted in a counterclockwise direction, as viewed in FIG. 2, the roller 32 is moved toward turning axis A for engagement with the workpiece W. The lower end of the swing arm 30 includes a rotatable lug 33 mounted through the lower end of the swing arm 30 and provided with internal threads. An adjustment screw 35 is threaded into the lug 33. The screw 35 is provided with any suitable bearing means 36, as shown in FIG. 2, and is mounted in the side frame members 21 and 22. The bearing means of the screw 36 are mounted in a rotatable lug 37 which pivots within the frame members 21 and 22. Accordingly, as the handle or adjustment knob 38 of the screw 35 is rotated, the screw rotates and the lower end of the swing arm 30 moves along the screw. Since the swing arm 30 is pivoted to the frame members 21 and 22, the lug 33 on the swing arm tends to translate in a circular path about pivot point 31. As this movement takes place, the rotation of the lug 37 accommodates the circular motion of lug 33, the screw both being free to rotate and to pivot.

The lower support 27 includes a bracket 40 mounted between frame members 21, 22. A slider 41 is mounted within the bracket 40 and is provided with a stub axle 42 on which is mounted a roller 43 for engaging and supporting the workpiece W at a lower position. An adjustment screw 44 is threaded to the slider 41 and is mounted on a lower plate 45 of the bracket 40. Rotation of the adjustment knob 46 reciprocates the slider 41 and the roller 43 toward and away from the turning axis A of slant bed lathe 10.

A stop means or socket 50 is provided in the bracket 40 and is preferably a simple cut out provided with a filler having a depressed area 51. The stop means or socket 50 is thus provided on the frame, and more particularly bracket 40, for use in connection with the near side work support as will now be described.

The near side work support means 28 includes a swing arm 60 pivoted at 61 to the frame members 21, 22. The upper end of the swing arm 60 carries a roller 62 which is swingable toward and away from the workpiece and the turning axis A, about the pivot 61. The lower end of the swing arm 60 is provided with a lug 63 carrying internal threads. An adjustment screw 64 provided with an adjustment knob 65 is mounted within the lug 63. Adjustment screw 64 has an abutment end 66 comprising, for example, a ball as shown in FIGS. 2 and 3, in use seated in the depressed area 51 of the socket 50. As shown in FIG. 2, when the adjustment knob 65 is rotated in one direction so as to draw the lower end of the swing arm 60 and the lug 63 outwardly, the roller 62 is urged inwardly against the workpiece W toward the turning axis A.

Turning now to FIG. 3, the operation of the preferred steadyrest of this invention is clearly shown and will be appreciated. The knob 65 is rotated in a direction so as to release the roller 62 from the workpiece W, i.e., to move the roller away from the turning axis A. This assumes either the swing arm remains stationary or that its lug 63 is moved by screw rotation toward the abutment end 66. It is only necessary to turn the adjustment screw 64 a few turns in order to relieve the pressure of the ball 66 against the socket 50, and produce the clearance necessary for the ball end 66 to clear the socket 50.

Once the screw 64 is rotated only several turns, the ball 66 can be removed and unseated from the depressed area 51. Thereafter, the screw can be pivoted (in a counterclockwise direction as viewed in FIG. 3) within the lower end of the swing arm 60 by means of the rotatable lug 63, so that the entire swing arm 60 can be pivoted away from the workpiece W and the turning axis A without further rotation of the adjustable screw. In fact, it will be appreciated that the lower end of the swing arm 60 and the screw 63 tends to outweigh the upper end of the swing arm 60. Once the ball 66 is removed from the socket 50, the support tends to be self-opening, by means of gravity, and the swing arm 60 is pivoted automatically in a counterclockwise direction, thereby moving the roller 62 away from the workpiece W and the turning axis A.

Accordingly, it will be appreciated that with only a few turns, the swing arm 60 has its upper end swung away from the workpiece W to provide ready and easy access to the workpiece, for moving the workpiece out of the turning station or for inspection or other adjustment.

The steadyrest is thus very quickly and readily removed from the workpiece to provide access thereto and without requiring a total back off of all fine workpiece adjustments.

It will further be appreciated that access is easily gained to the workpiece without disturbing the setting of the far side work support means 26 and the lower work support means 27. Thus, the workpiece W can be readily removed from the turning apparatus and from the workpiece steadyrest by release of only one of the three steadyrest supporting components and without requiring tedious backing off of the fine adjustment of the removable near side work support 28.

Nevertheless, fine adjustment of the work supporting rollers 32, 43 and 62 is not sacrificed in order to accomplish this objective, but rather the steadyrest can be finely adjusted to provide three-point support for the workpiece while still producing a readily accessible turning apparatus by means of the readily removable near side support means 28.

These and other advantages and modifications will become readily apparent to those of ordinary skill in the art, without departing from the scope of this invention, and the applicant intends to be bound only by the claims appended hereto.

I claim:

1. A workpiece steadyrest for a metal working apparatus, said steadyrest including:
a steadyrest frame;
a pivot arm;
pivot means for pivotally securing said arm to said frame;
a first workpiece supporting roller mounted on one end of said pivot arm and movable into a workpiece supporting position;
adjustment screw means for urging said roller against a workpiece, said screw means including a rotatable screw;
means for pivotally and rotationally mounting said screw at another end of said pivot arm for relative movement of said arm end along said screw when said screw is rotated, and for pivotal motion of said screw with respect to said pivot arm;
socket means fixed on said steadyrest frame for releasably and rotationally receiving one end of said screw;
said one end of said screw being releasably disposed in said socket;
said other pivot arm end being movable along said screw upon rotation of said screw and said one end of said pivot arm pivoting about said pivot means when said screw is rotated to move said first roller to and away from said workpiece supporting position; and
said one end of said screw being removable from said socket, upon rotation of said screw, and said pivot arm being freely rotatable about said pivot means without further screw rotation when said screw is removed from said socket, to withdraw said first roller from said workpiece supporting position.

2. A steadyrest, as in claim 1, wherein said steadyrest further includes:
a stationary bracket mounted on said frame;
said socket disposed on said bracket;
a second workpiece engaging roller; and
means mounting said second roller on said stationary bracket for adjustment into engagement with a workpiece independently of the position of said first roller.

3. A steadyrest, as in claim 2, further including:
a second pivot arm;
second pivot means for pivotally mounting said second pivot arm to said frame;
a third workpiece supporting roller mounted on one end of said second pivot arm for supporting a workpiece at a position removed from said other rollers;
a second pivot arm adjustment screw;
means operatively coupling said second pivot arm adjustment screw to another end of said second pivot arm for relative motion between said second pivot arm and its coupled screw upon rotation thereof; and
means pivotally mounting said second pivot arm adjustment screw to said frame for free rotation and for swinging motion with respect thereto.

4. In a turning apparatus, a steadyrest for supporting a workpiece wherein said steadyrest includes:
a frame;
a pivot arm pivoted to said frame;
at least one work supporting roller;
means mounting said roller on said pivot arm for motion to and from workpiece holding positions;
pivot arm adjustment means secured to said pivot arm and including a screw rotatably and pivotally mounted on said arm for relative longitudinal movement of said arm with respect to said screw;
said screw having one end removably supported against a fixed support surface on said frame and against longitudinal movement in one direction such that rotation of the screw moves said pivot arm toward and away from said work holding position; and
said one screw end being removable from said support surface upon rotation of said screw in one direction to permit free swinging of said pivot arm without further rotation of said screw.

5. A workpiece steadyrest for supporting a workpiece in a turning apparatus defining a turning axis, wherein said steadyrest includes:
a frame;
a first workpiece supporting roller;
a first swing arm having two ends;
means for pivoting said first swing arm to said frame intermediate said two ends;
said first workpiece supporting roller mounted on one end of said first swing arm for movement toward and away from said turning axis and on one side thereof;
a releasable adjustment screw;
means for operatively coupling said releasable adjustment screw with another end of said other swing arm;
said screw having a socket abutment end;
socket means on said frame for releasably and rotatably receiving said socket abutment end of said screw;
said socket abutment end of said screw being rotationally and removably disposed in said socket such that when said screw is rotated in one direction, said other end of said other swing arm is swung outwardly with respect to said frame and said first roller is swung inwardly toward said axis;
said socket abutment end of said screw being releasable from said socket means on said frame upon rotation of said releasable screw in another direction such that said socket abutment end can be released from said socket means;
said first workpiece supporting roller being thereafter pivotable outwardly away from said axis without further rotation of said releasable adjustment screw;
a second workpiece supporting roller;
means adjustably mounting said second roller beneath said turning axis and for reciprocal movement toward and away from said axis;
a third workpiece supporting roller;
a second swing arm;
means mounting said third roller on said second swing arm;
means pivotally mounting said swing arm to said frame for swinging movement toward and away from said axis on another side thereof;
said second swing arm having two ends, and being pivoted to said frame intermediate the ends; and
a second adjustment screw operatively threaded into another end of said second swing arm, means pivotally mounting said second screw on said frame whereupon said second swing arm pivots, upon rotation of said second adjustment screw, to swing said third workpiece supporting roller toward and away from said axis at said other side thereof.

6. A workpiece steadyrest for a slant bed lathe, said steadyrest operative to support a workpiece underneath same and at near and far sides thereof, and further comprising means facilitating releasing a near side workpiece support for access to said workpiece, said lathe defining a turning axis about which said workpiece is mounted for turning and said steadyrest comprising:
   a steadyrest frame;
   a first adjustable roller means for supporting a near side of said workpiece opposite said bed at a near side of said axis;
   a second adjustable roller means for supporting a workpiece beneath said axis;
   a third adjustable roller means for supporting said workpiece at a far side of said axis adjacent said bed; and
   said first adjustable roller means including:
   a swing arm having two ends;
   means pivoting said swing arm, intermediate ends thereof, to said frame;
   a roller mounted at one end of said swing arm for engaging and supporting a near side of said workpiece;
   a releasable adjustment screw;
   means operatively coupling said adjustment screw to another end of said swing arm for longitudinal motion of said swing arm end along said screw when said screw is rotated, and for pivotal motion with respect to said swing arm;
   a socket means on said frame;
   said releasable screw having a socket abutment end in rotatable and releasable engagement with said socket means;
   said screw being rotatable to drive said other end of said swing arm therealong and to move said roller toward and away from said axis when said swing arm pivots; and
   said socket abutment end of said screw being releasable from said socket means upon screw rotation moving said roller away from said axis, and said swing arm being thereafter pivotable, without further rotation of said adjustment screw, such that said roller can be freely swung away from said axis.

* * * * *